United States Patent [19]
Eriksson et al.

[11] Patent Number: 6,119,674
[45] Date of Patent: Sep. 19, 2000

[54] MANUALLY OPERATED CUTTING DEVICE

[75] Inventors: Thomas Eriksson, Sundborn, Sweden; Josef Schittl, Thüringen, Austria

[73] Assignee: Hilti Aktiengesellschaft, Schaan, Liechtenstein

[21] Appl. No.: 09/186,507

[22] Filed: Nov. 4, 1998

[30] Foreign Application Priority Data

Nov. 5, 1997 [DE] Germany .......................... 197 48 809

[51] Int. Cl.⁷ .................................................. B28D 1/08
[52] U.S. Cl. ........................................................ 125/21
[58] Field of Search .............................. 125/21; 30/380, 30/381, 383, 384, 385, 386; 83/809

[56] References Cited

U.S. PATENT DOCUMENTS

| | | | |
|---|---|---|---|
| 3,509,704 | 5/1970 | Henzman | 56/291 |
| 3,590,892 | 7/1971 | Ehlen | 143/133 |
| 4,097,246 | 6/1978 | Olson | 51/309 R |
| 4,557,054 | 12/1985 | Beerens | 30/384 |
| 5,184,598 | 2/1993 | Bell | 125/21 |
| 5,501,209 | 3/1996 | Wenger | 125/21 |
| 5,603,311 | 2/1997 | Hoerner et al. | 125/21 |

*Primary Examiner*—Timothy V. Eley
*Assistant Examiner*—Dung Van Nguyen
*Attorney, Agent, or Firm*—Brown & Wood, LLP

[57] ABSTRACT

A manually operated cutting device for cutting stones, concrete and similar materials and including a cutting element (90,190) formed of a rotatable ring-shaped support member (50,150) having a circumferential indentation (51, 151), and a band-shaped continuous cutting tool (70,170) provided with a plurality of cutting bodies (71,171) and cooperating with the indentation (51,151) of the support member (50,150).

9 Claims, 8 Drawing Sheets

MANUALLY OPERATED CUTTING DEVICE

BACKGROUND OF THE INVENTION

1. Field of the Invention

The present invention relates to a manually operated cutting device for cutting stones, concrete or the like and including a cutting element formed of a rotatable ring-shaped support member, and a plurality of cutting bodies cooperating at least with a portion of the circumference of the support member.

2. Description of the Prior Art

European Publication EP-0060971 discloses a manually operated cutting device for cutting stones, concrete and the like. The cutting device includes a cutting element which is formed of a support member and a plurality of cutting bodies uniformly distributed over the circumference of the support member. The ring-shaped support member cooperates with appropriate drive and guide elements located outside of the rotational center of the ring-shaped support member. This cutting element permits to achieve rather large cut depths.

The costs of the known cutting device are very high because its manufacture involves several, following one another, manufacturing stages. At the first stage, the ring-shaped support member is formed. Providing of the cutting bodies on the circumference of the support member is effected in a second stage. Balancing of the cutting element is effected in a third stage.

When the cutting bodies of this cutting element wore off, the entire cutting element need be replaced. To remove the cutting element from the cutting device and/or for disconnecting it from the driving wheel and the guide rollers, at least one guide roller should be displaced with an appropriate tool to displace the support member relative to the driving wheel and other guide roller(s) to be able to remove the cutting element. The mounting of the replacing cutting element is effected in a reverse order. When displacing the previously displaced guide roller into its initial position, care should be taken to prevent any jamming or a noticeable clearance between the displaced guide roller and the support body. In addition to the high costs of the cutting device itself, the costs of mounting and dismounting of the cutting element negatively affect the economy of using this cutting device.

Accordingly, an object of the present invention is to provide a manually operated cutting device which can be economically produced, which would have a high cutting output, and in which the cutting element can be quickly and easily replaced.

SUMMARY OF THE INVENTION

These and other objects of the present invention, which will become apparent hereinafter, are achieved by providing a cutting device the cutting element of which includes a band-shaped continuous cutting tool provided with a plurality of cutting bodies and cooperating with an indentation formed in the support member. The cutting bodies according to the present inventions can be formed, e.g., as hollow cylindrical beads spaced from each other and connected with strands of a steel core. Spacing elements, e.g., in form of compression springs, can be provided between the cutting bodies, which are imbedded in a rubber layer. Such a cutting tool can be economically produced and, therefore, is very cost-effective. This cutting tool can be quickly and easily removed from the support body and the driving wheel and easily mounted thereon.

In order to prevent the cutting tool from springing out of the indentation formed in the support member, it is pre-stressed by a tensioning device.

The prestress can advantageously be effected with at least one spring which displaces the tensioning device at least in one direction. The spring permits to achieve a uniform prestress which provides for an oscillation-free behavior of the cutting tool during the cutting process.

In order to prevent frictional losses between the tensioning device and the cutting tool, advantageously, the tensioning device includes a rotatable roll provided with a circumferential indentation which like the indentation formed in the support member, serves for guiding the cutting tool.

The cutting bodies of the cutting tool can have, e.g., a cylindrical shape. In order to provide for uniform wear of the cutting bodies, the indentation, which is formed in the roll of the tensioning device, extends preferably in a plane which extends parallel to and is offset relative to the plane in which the indentation formed in the support member extends. The offset can amount to, e.g., from 0.5 mm to 10 mm. During operation of the cutting device, the offset of the indentations of the roll and the support member provides for rotation of the cutting tool in such a way that a cutting body rolls in the indentations. Thereby, the circumference of the cutting body uniformly wears off.

In order to prevent the indentations of the roll and the support member from being damaged, a transmission member can be provided between at least the support member and the cutting tool. The continuous transmission member prevents direct contact of the cutting tool with the support body and the roll. A transmission member having a very flexible characteristic is advantageously formed by a belt the inner profile of which corresponds to the profile of both indentations, and the outer profile of which corresponds to the profile of the cutting tool.

In order to form the cutting device as small as possible and with few separate parts, the cutting tool is preferably driven by a driving wheel cooperating with at least the support member.

For increasing the friction force between the driving wheel and the support member, a transmission member is provided therebetween for transmitting the rotational movement of the driving wheel to the support member. To reduce the dimensions of the cutting device, advantageously, the driving wheel is formed as a guide roller which is arranged, in addition to at least two other guide rollers, outside of the rotational center of the support body.

BRIEF DESCRIPTION OF THE DRAWING

The features and objects of the present invention will become more apparent, and the invention itself will be best understood from the following detailed description for the preferred embodiments when read with reference to the accompanying drawings, wherein.

DETAILED DESCRIPTION OF THE PREFERRED EMBODIMENTS

Figure 1:
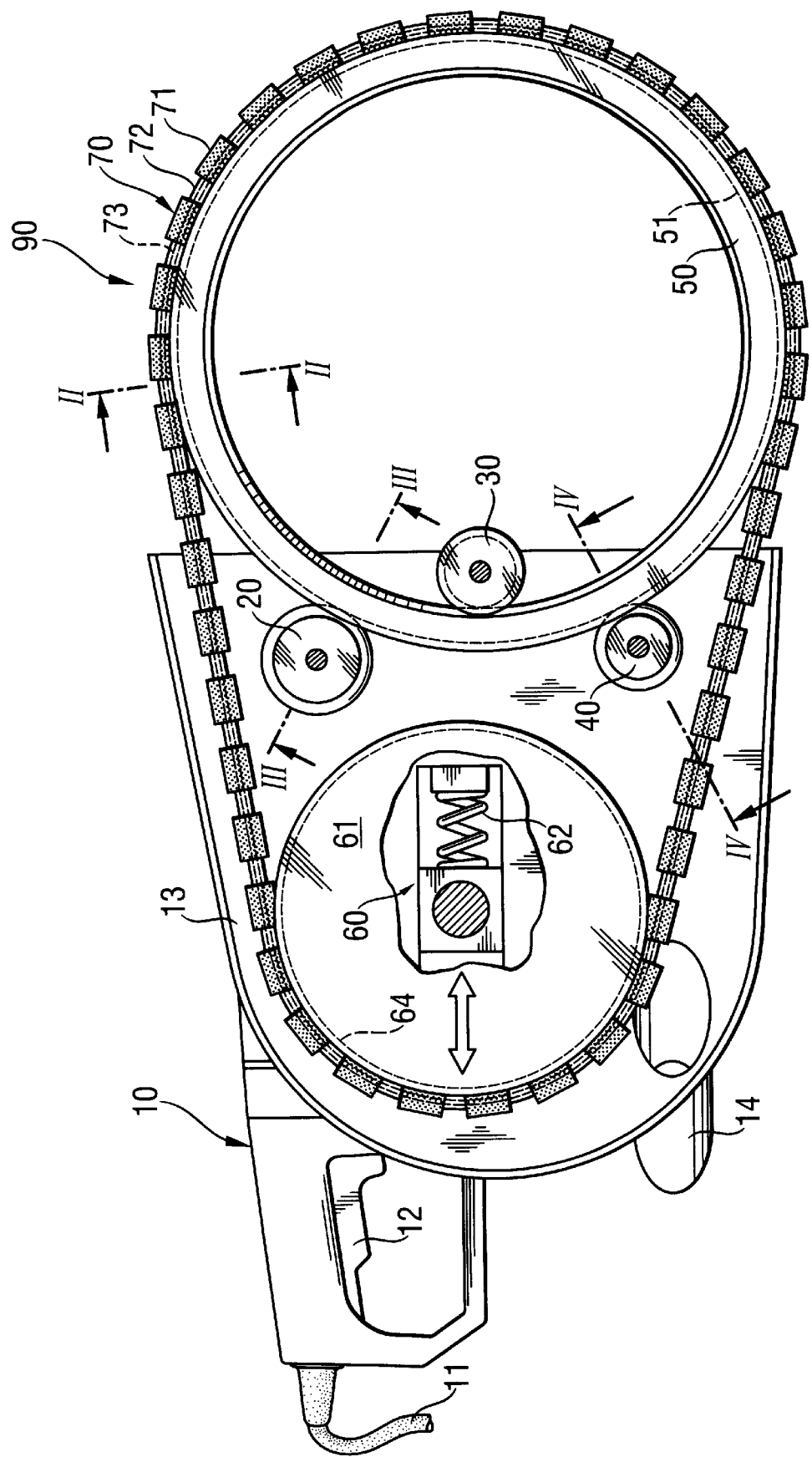
FIG. 1 shows a side view of a manually operated cutting device according to the present invention, with the device cap being removed.
Figure 2:
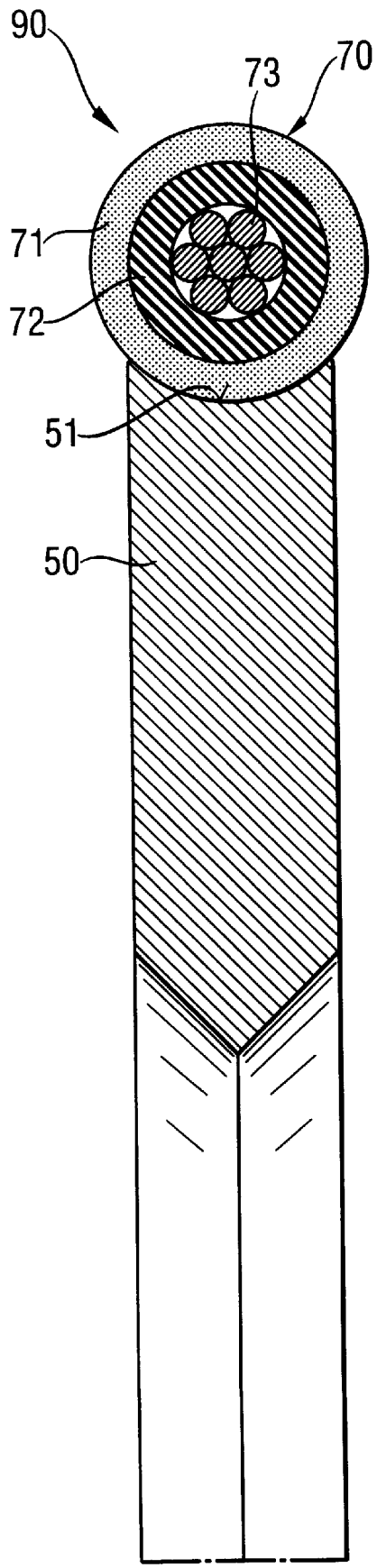
FIG. 2 shows a cross-sectional view along line II—II in FIG. 1 at an increased scale.

A manually operated cutting device for cutting stones, concrete and the like according to the present invention, two embodiments of which are shown in FIGS. 1–4 and 5–8, respectively, includes a housing 10,110 with a handle provided with an actuation trigger 12,112 for actuating the cutting device. A drive (not shown), e.g., an electromotor, is located in the housing 10,110 and is connectable with an external power source by an electrical connection line 11,111. Sidewise of the housing 10,110, there is located a cover 13,113 which has its side remote from the housing 10,110 covered with a cap (not shown). In the handle region of the housing, the cover 13,113 has a connection union 14,114 connectable by a hose (not shown) with a suction device (likewise not shown). A drive-driven driving wheel 20,120 projects into the interior of the cover 13,113. In addition to the driving wheel 20,120, an outer guide roller 40,140, an inner guide roller 30,130 and a tensioning device 60,160 are located in the interior of the cover 13,113. The cover 13,113 is provided at its side remote from the handle with an opening. A cutting element 90,190, which is formed of a ring-shaped support member 50,150 and a band-shaped continuous cutting tool 70,170, partially projects into the interior of the cover 13,113 through this opening.

The support member 50,150 is rotatably supported and is displaced sidewise by the driving wheel 20,120 and the inner and outer rollers 30,40 and 130,140. The driving wheel 20, 12, and the inner and outer rollers 30,130 and 40,140 are arranged outside of the rotational center of the support body 50,150 and cooperate with three different points of the support member 50,150.

The support member 50,150 is provided on its circumference with an indentation 51,151 which serves for guiding the cutting tool 70,170. The cutting tool 70,170 cooperates with the tensioning device 60,160 which provides for prestress of the cutting tool 70,170. The tensioning device 60,160 includes a rotatable roll 61,161 the circumference of which is provided with an indentation 64,164. The indentation 64,164 serves for guiding the cutting tool 70,170 and has a profile which substantially corresponds to the profile of the cutting tool 70,170.

The cutting tool 70,170 which is shown in FIGS. 1–3 and 5–7, respectively, is formed of a steel core 73,173 consisting of a plurality of separate strands, of a plurality of beads formed as cylindrical cutting bodies 71,171 provided on the steel core 73,173, and of a plurality of spacing elements, 72,172 arranged between the cutting bodies 71,171 and which are arranged on a rubber base. The free ends of the steel core 73,173 are e.g., braided with each other to form a continuous cutting tool 70,170.

FIG. 1 shows that the cutting tool 70 is prestressed with a spring 62 supported against a displaceable roll 61 and against a stop provided on the cover 13 and located between the roll 61 and the circular support member 50.

Figure 3:
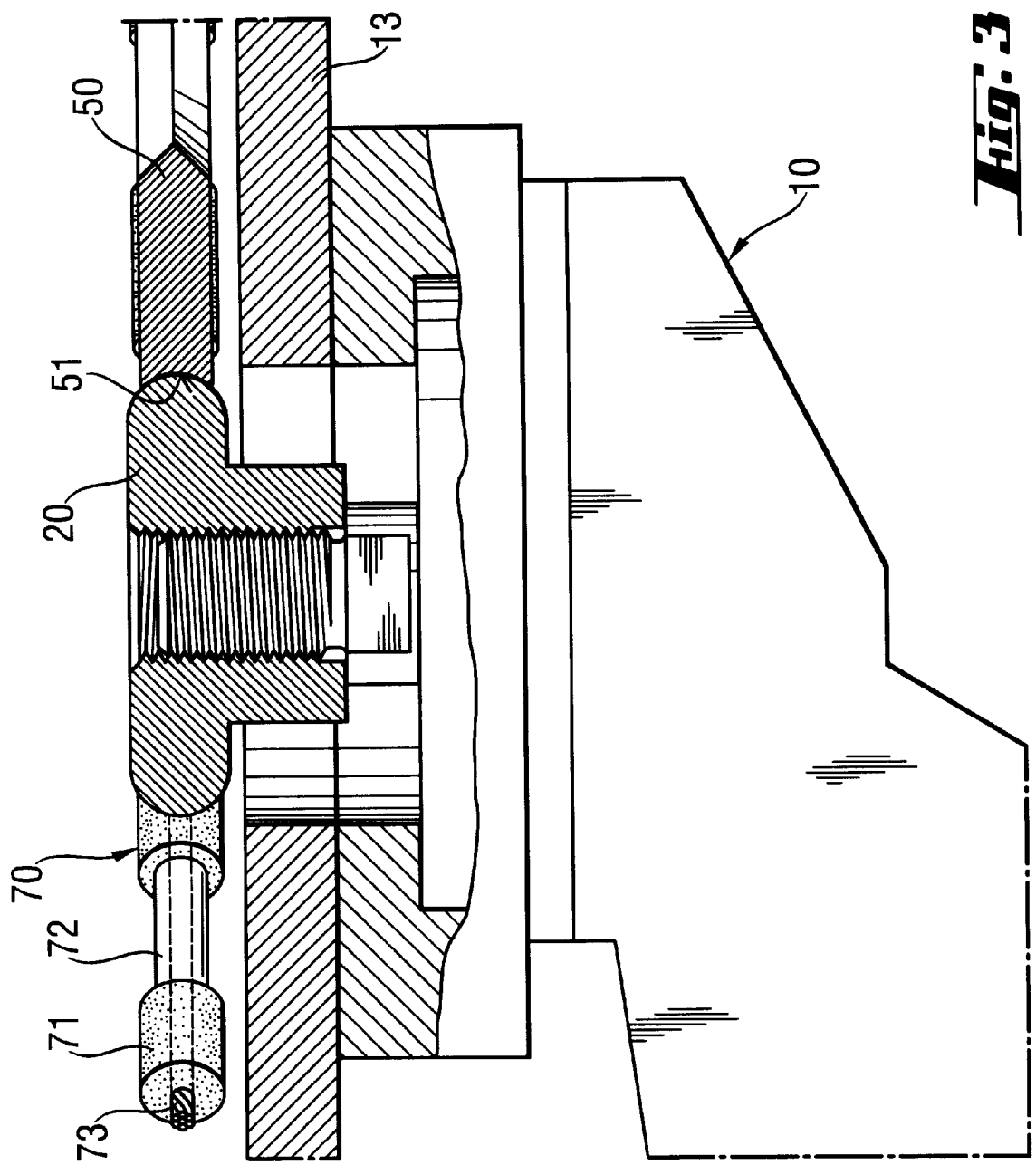
FIG. 3 shows a cross-sectional view along line III—III in FIG. 1 at an increased scale.

The driving wheel 20, which is shown in FIGS. 1 and 3, force-lockingly engages the support member 50, and a rotational movement of the driving wheel 20 is transmitted to the ring-shaped support member 50. The driving wheel 20 is connected with a drive shaft of the not-shown drive by a thread connection. The cross-section of the driving wheel 20 taken parallel to the central axis of the driving wheel 20 has a profile substantially corresponding to the indentation 51 of the circular support member 50.

Figure 4:
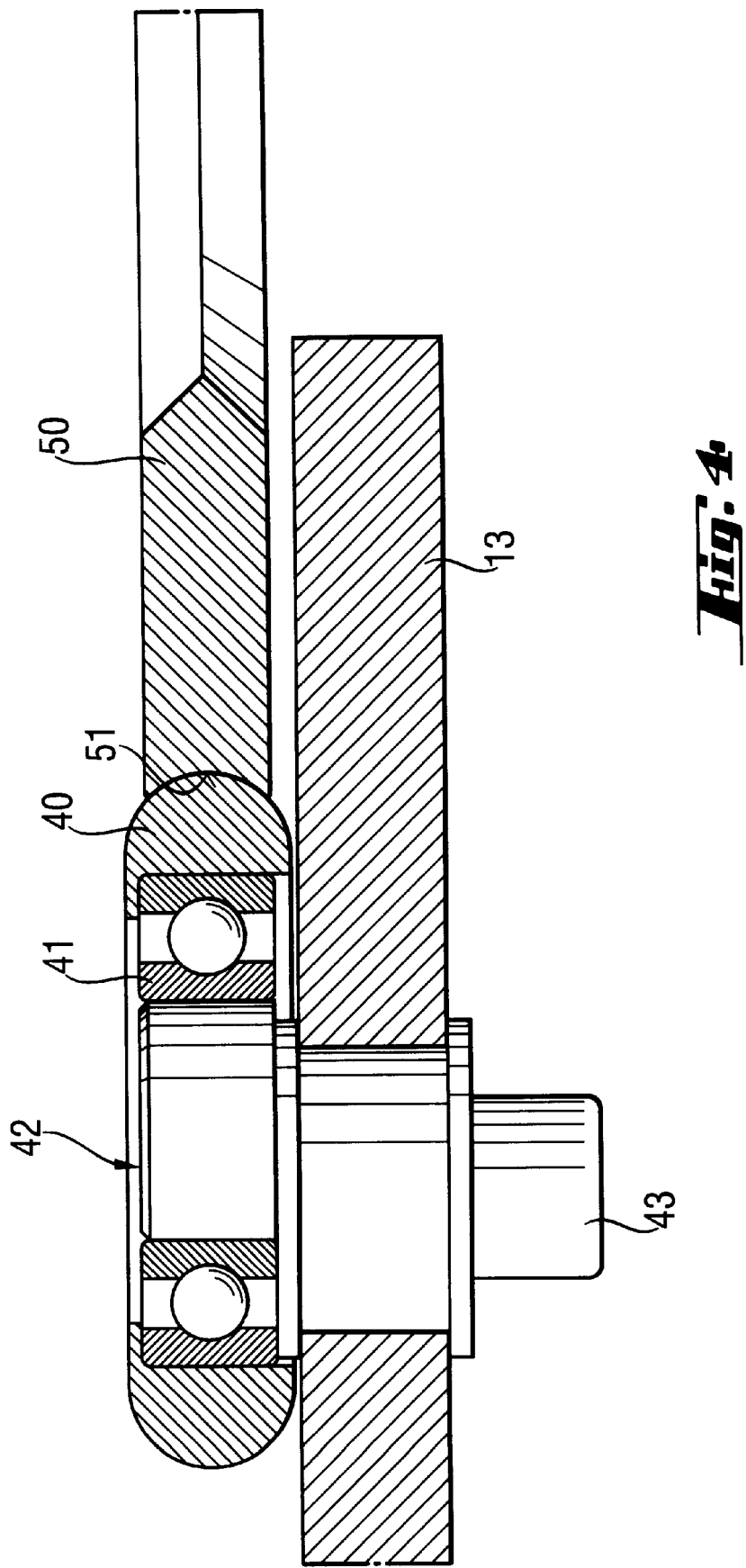
FIG. 4 shows a cross-sectional view along line IV—IV in FIG. 1 at an increased scale.

The outer guide roller 40, which is shown in FIGS. 1 and 4, has substantially the same profile as the driving wheel 20. The outer guide roller 40 has a central bore in which a support element 41 formed as a ball bearing is located. A journal of an eccentric member 42 is received in the ball bearing. The eccentric member 42 provides for a substantially radial displacement of the outer guide roller 40 relative to the support member 50 at least to an extent that the driving wheel 20 does not project any more into the indentation 51 of the support member 50. In this way, the support member 50 is displaced relative to the driving wheel 20 and the inner guide roller 30 to an extent that the profiles of both the driving wheel 20 and the inner guide roller 30 do not cooperate any more with the support member 50.

The ring-shaped support member 50 has an inner profile tapering toward the center. The inner guide roller 30 has a corresponding complimentary profile.

Figure 5:
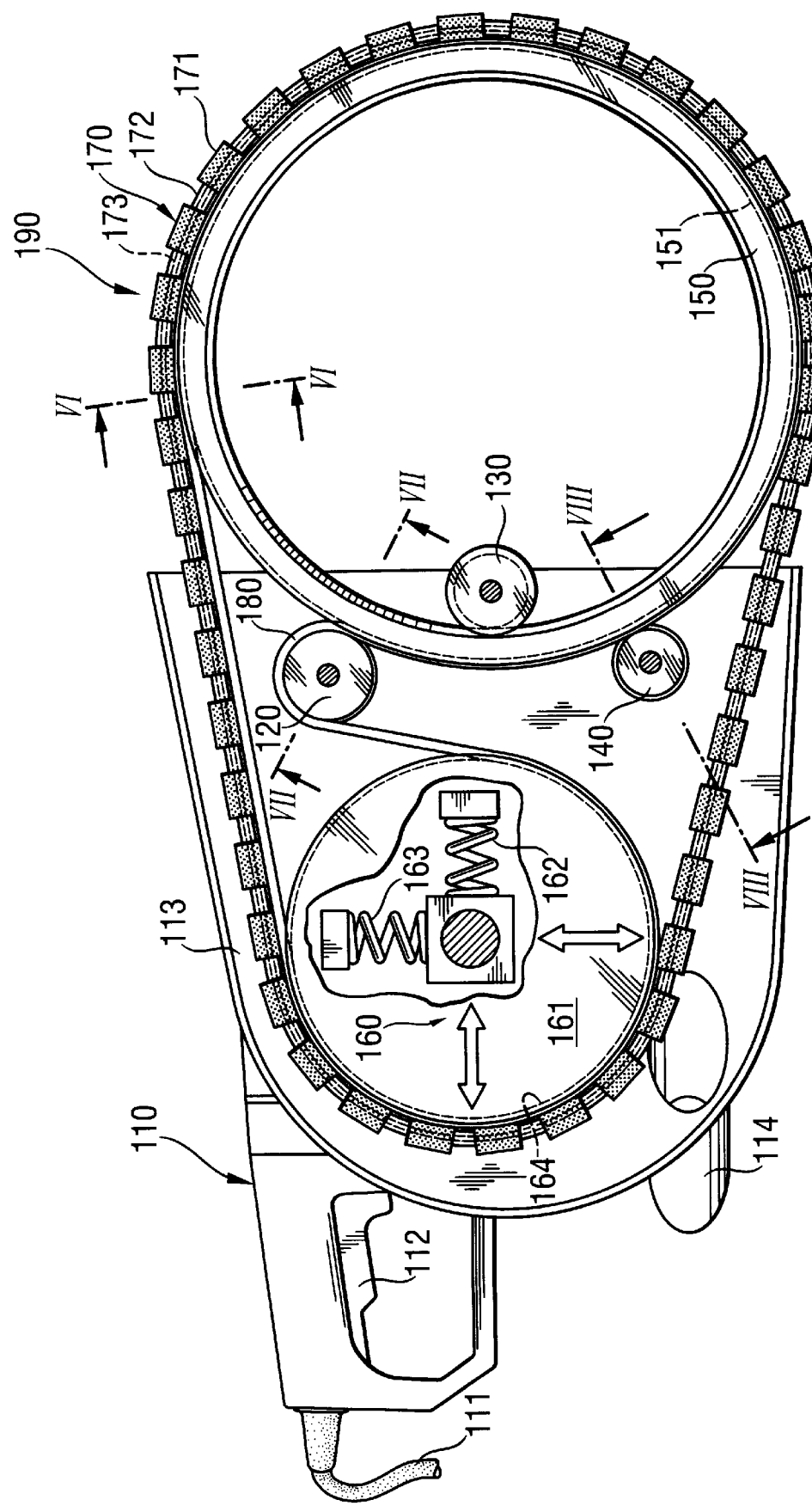
FIG. 5 shows a side view of another embodiment of a manually operated cutting device according to the present invention, with the device cap being removed.

In the manually operating cutting device shown in FIG. 5, a continuous, transmission, belt-shaped member 180 is provided between the cutting tool 170 and the support member 150 and between the cutting tool 170 and the roll 164 of the tensioning device 160. The transmission member 180 is partially wound about the driving wheel 120 and extends between the driving wheel 120 and the support member 150 and between the outer guide roller 140 and the support member 150.

Figure 6:
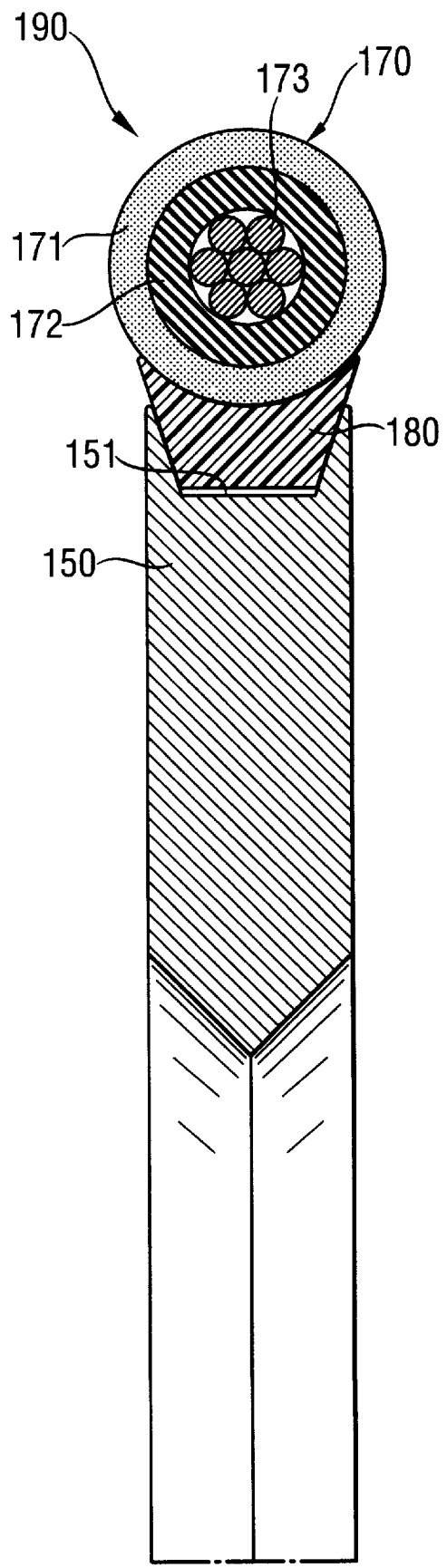
FIG. 6 shows a cross-sectional view along line VI—VI in FIG. 5 at an increased scale.
Figure 7:
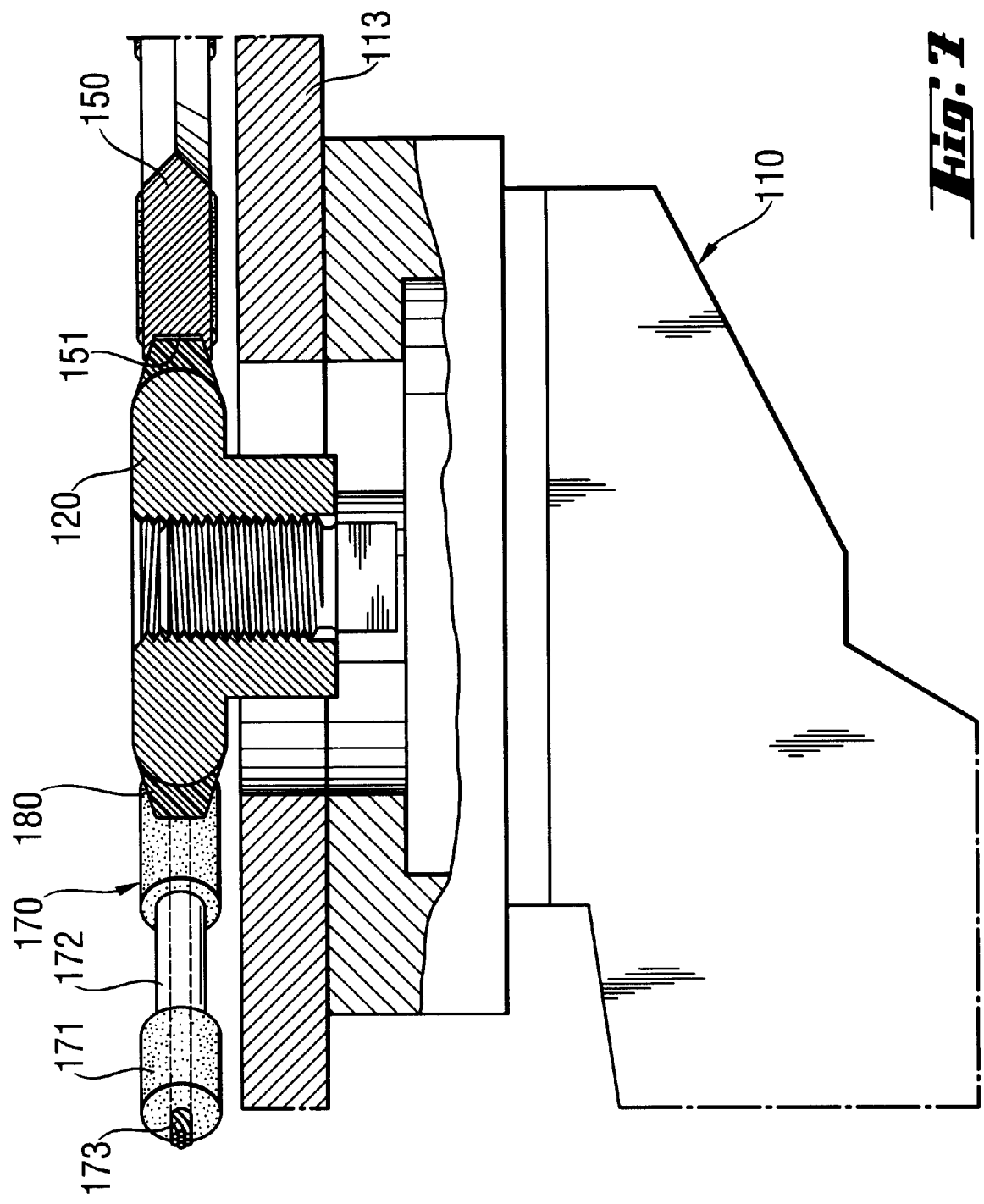
FIG. 7 shows s cross-sectional view along line VII—VII in FIG. 5 at an increased scale.
Figure 8:
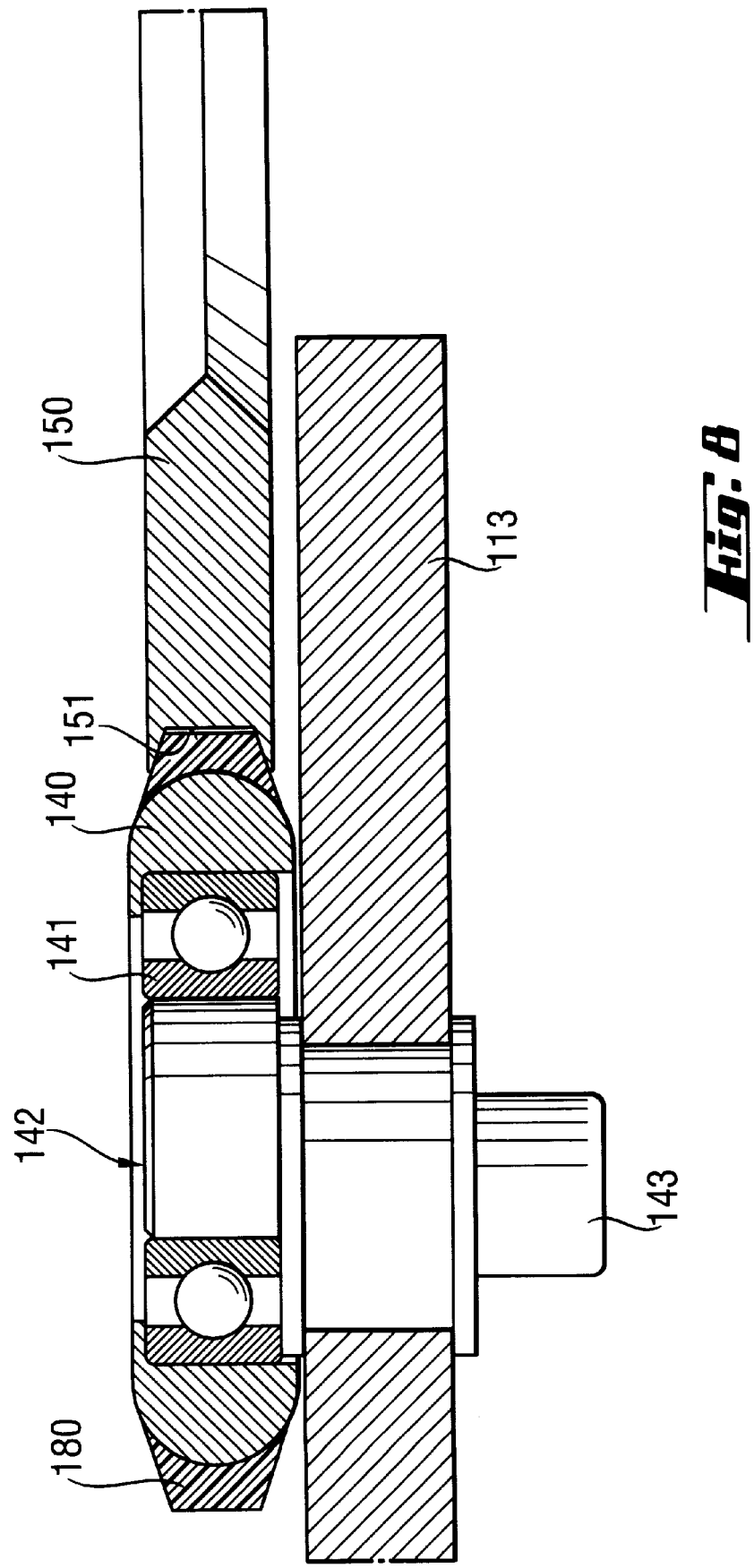
FIG. 8 shows a cross-sectional view along line VIII—VIII in FIG. 5 at an increased scale.

As shown in FIGS. 6–8, the support member 150 has a circumferential indentation 151 having a trapezoid cross-section into which the transmission member 180 at least partially projects.

The inner profile of the transmission member 180 corresponds substantially to both the profile of the indentation 151 of the support member 150 and the profile of the indentation 164 of the roll 161. The outer profile of the transmission member 180 corresponds substantially to the profile of the cutting tool 170.

The outer guide roller 140, which cooperates with the support member 150 have a circumference the outer profile of which corresponds to the profile of the indentation 151 of the support member 150.

As shown in FIG. 5, the tensioning device 160 cooperates with first and second spring members 162 and 163. The first spring member 162 biases the roller 161 of the tensioning device 160 away from the support member 150 in a first direction, providing for tensioning of the cutting tool 170 guided by the roller 161 and the support member 150. The second spring member 163 displaces the roll 161 in a second direction substantially perpendicular to the first direction. Upon the displacement of the roll 161 in the second direction, the distance between the roll 161 and the driving wheel 120 increases, and the transmission member 180 becomes prestressed to a greater degree.

The transmission member 180 forcelockingly connects the driving wheel 120 with the support member 150, whereby the rotational movement of the driving wheel 120 is transmitted to the support member 150. The driving wheel 120 is connected with the drive shaft of the not-shown cutting device drive by a thread connection. The cross-section of the driving wheel 120 taken parallel to the central axis of the driving wheel 120 has a profile substantially corresponding to the profile of the indentation 151 of the support member 150.

The outer guide roller 140, which is shown in FIGS. 5 and 8, has a profile substantially corresponding to that of the driving wheel 120. The guide roller 140 has a central bore in which a support element formed as a ball bearing is located. A journal of an eccentric member 142 is received in the bearing 141. The support member 150 is displaced by the eccentric member 142, upon its rotation. The eccentric member 142 is rotated when the attachment stub 143 is rotated with a suitable tool. The rotation of the eccentric member 142 causes displacement of the outer guide roller 140 away from the support member 150 so that the profile of the outer guide roller 140 does not project any more into the indentation 151 of the support member 150. As a result, the support member is displaced relative to the driving wheel 120 and the inner guide roller 130 and is moved away from these two elements. The support member 150 has an inner profile tapering toward the center, and the inner guide roller 130 is provided with a complementary outer profile.

Though the present invention was shown and described with references to the preferred embodiments, various modifications thereof will be apparent to those skilled in the art and, therefore, it is not intended that the invention be limited to the disclosed embodiment or details thereof, and departure can be made therefrom within the spirit and scope of the appended claims.

What is claimed is:

1. A manually operated device for cutting stones, concrete and similar materials, comprising a cutting element (90, 190) including a rotatable ring-shaped support member (50, 150) having a circumferential indentation (51, 151), and a band-shaped continuous cutting tool (70, 170) provided with a plurality of cutting bodies (71, 171) and cooperating with the indentation (51, 151) of the support member (50, 150); means (20, 120) for rotating the cutting element (90, 190); a device (60, 160) for tensioning the cutting tool (70, 170); and at least one spring member (62, 162, 163) for displacing the tensioning device (60, 160) in at least one direction.

2. A manually operated cutting device for cutting stones, concrete and similar materials, comprising a cutting element (90, 190) including a rotatable ring-shaped support member (50, 150) having a circumferential indentation (51, 151), ands a band-shaped continuous cutting tool (70, 170) provided with a plurality of cutting bodies (71, 171) and cooperating with the indentation (51, 151) of the support member (50, 150); means (20, 120) for rotating the cutting element (90, 190); and a device (60, 160) for tensioning the cutting tool (70, 190), wherein the tensioning device (60, 160) comprise a rotatable roll (61, 161) provided with a circumferential indentation (64, 164).

3. A manually operated cutting device according to claim 2, wherein the circumferential indentation (64,164) is located in plane extending parallel to and offset relative to a plane in which the indentation (51,151) of the support member (50,150) is located.

4. A manually operated cutting device for cutting stones, concrete and similar materials, comprising a cutting element (90, 190) including a rotatable ring-shaped support member (50, 150) having a circumferential indentation (51, 151), and a band-shaped continuous cutting tool (70, 170) provided with a plurality of cutting bodies (71, 171) and cooperating with the indentation (51, 151) of the support member (50, 150); means (20, 120) for rotating the cutting element (90, 190); and a continuous transmission member (180) arranged at least between the support member (150) and the cutting tool (170), wherein the rotating means comprises at least one driving wheel (120) for rotating the support member (150), and wherein the transmission member (180) transmits a rotational movement of the driving wheel (120) to the support member (150).

5. A manually operated cutting device for cutting stones, concrete and similar materials, comprising a cutting element (90, 190) including a rotatable ring-shaped support member (90, 190) including a rotatable ring-shaped support member (50, 150) having a circumferential indentation (51, 151), and a band-shaped continues cutting tool (70, 170) provided with a plurality of cutting bodies (71, 171) and cooperating with the indentation (51, 151) of the support member (51, 150); and means (20, 120) for rotating the cutting element (90, 190), wherein the rotating the cutting element (90, 190), driving wheel (20, 120) for rotating the support member (50, 150), wherein the driving wheel (20, 220) is formed as a guide roller, and wherein the cutting device further comprises at least two further guide rollers (30, 40; 130, 140) outside of a rotational center of the support member (50, 150).

6. A manually operated cutting device for cutting stones, concrete and similar materials, comprising a cutting element (90, 190) including a rotatable ring-shaped support member (50, 150) having a circumferential indentation (51, 151); and a band-shaped continuous cutting tool (70, 170) formed as a steel core (73, 173) consisting of a plurality of separate strands and provided with a plurality of cutting bodies (71, 171) and a plurality of spacing elements (72, 172) arranged between the cutting bodies, the cutting tool cooperating with the indentation (51, 151) of the support member (50,150); means (20, 120) for rotating the cutting element (90, 190); and a continuous transmission member (180) arranged at least between the support member (150) and the cutting tool (170).

7. A manually operated cutting device according to claim 6, wherein the transmission member (180) is formed as a belt an inner profile of which substantially corresponds to a profile of the indentations (151,164) of the support member (150) and the roll (161), respectively, and an outer profile of which substantially corresponds to a profile of the cutting tool (170).

8. A manually operated cutting device for cutting stones, concrete and similar materials, comprising a cutting element (90, 190) including a rotatable ring-shaped support member (50, 150) having a circumferential indentation (51, 151), and a band-shaped continuous cutting tool (70,170) formed as a steel core (73, 173) consisting of a plurality of separate strands and provided with a plurality of separate cutting bodies (71, 171) and a plurality of spacing elements (72, 172) arranged between the cutting bodies, the cutting tool cooperating with the indentation (51, 151) of the support member (50, 150); and means (20, 120) for rotating the cutting element (90, 190) and comprising at least one driving wheel for rotating the support member (50, 150).

9. A manually operated cutting device according to claim 8, wherein the driving wheel (20, 120) is arranged within the continuous cutting tool (70, 170) and cooperates at least with the support member.

* * * * *